INVENTORS
David C. Aungst,
Ira T. Clement
BY
ATTORNEYS

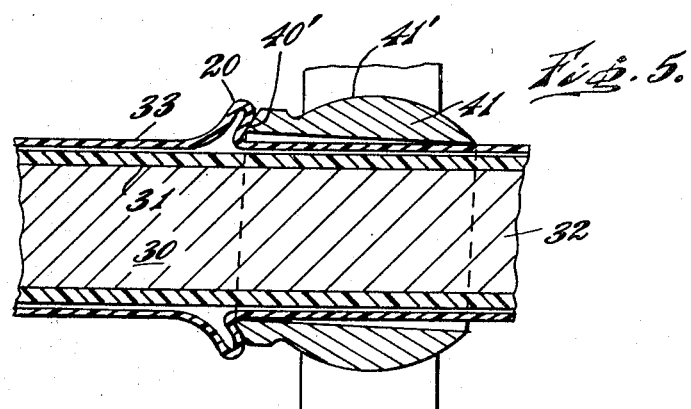
Fig. 5.
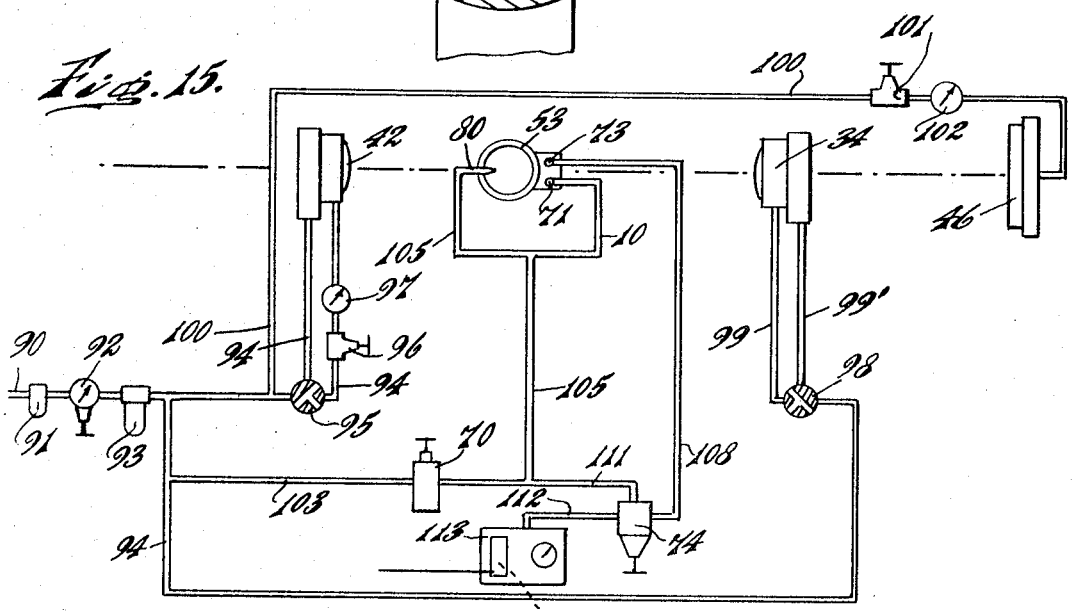
Fig. 15.
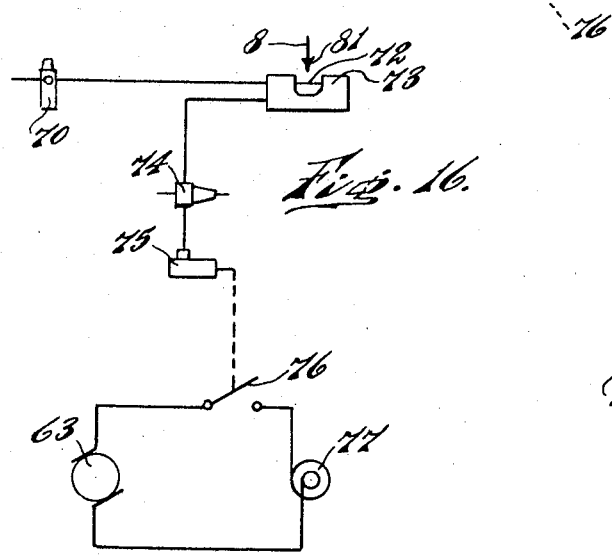
Fig. 16.
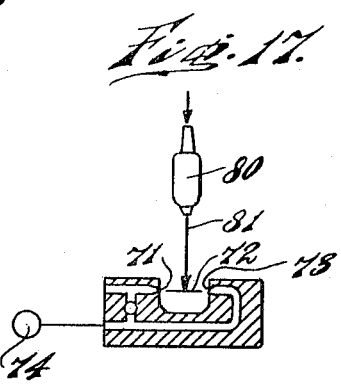
Fig. 17.

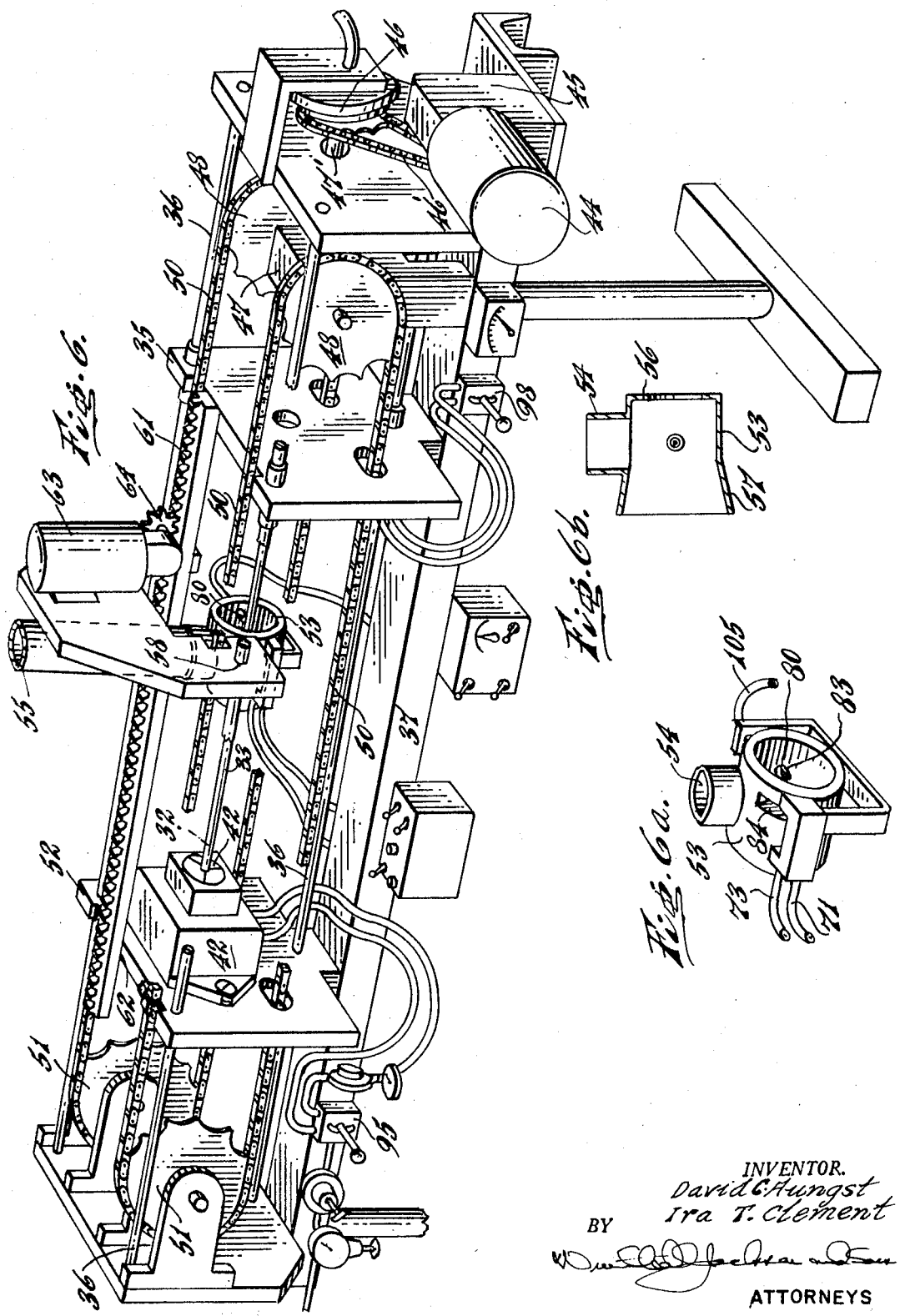

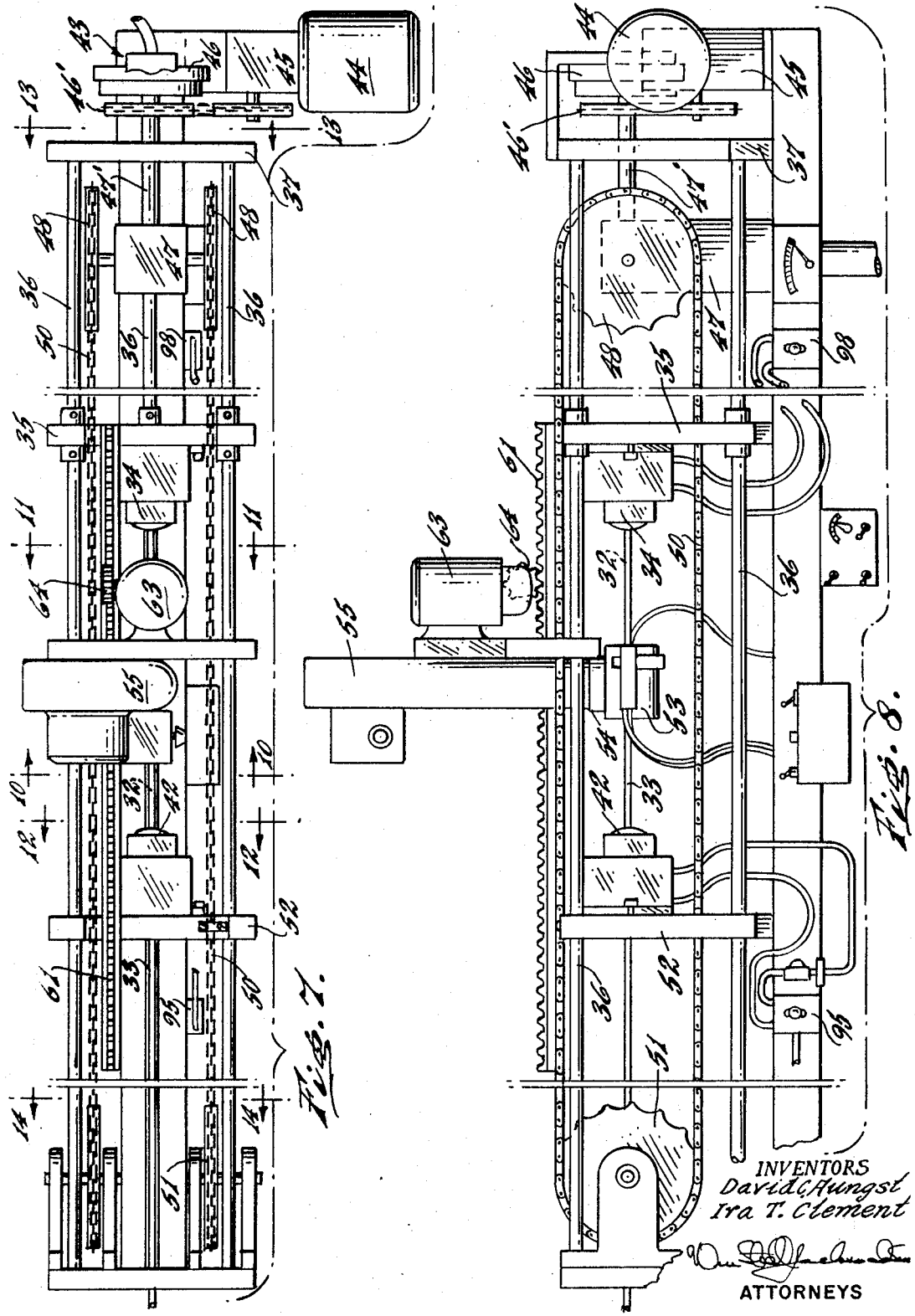

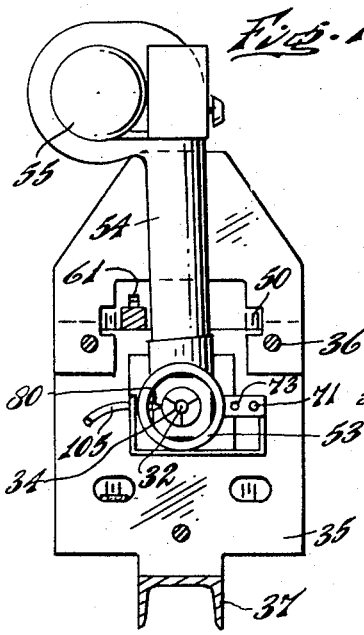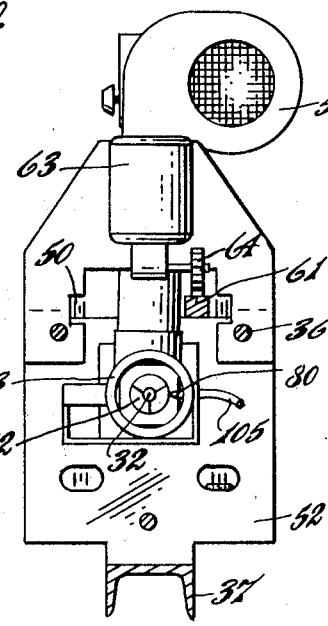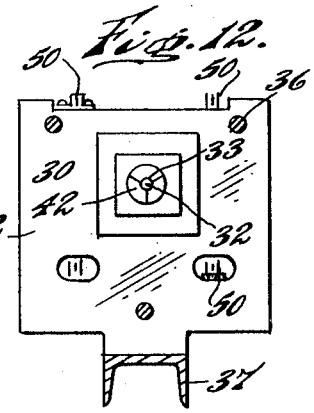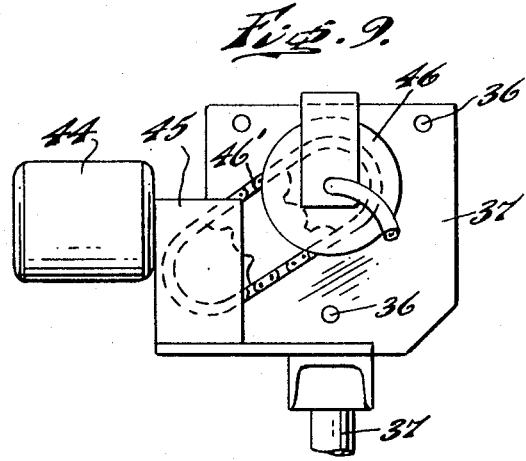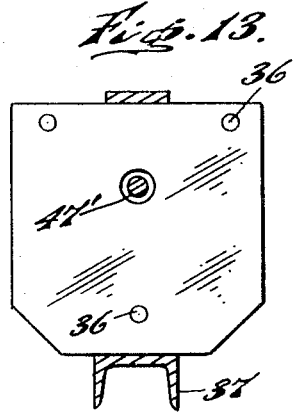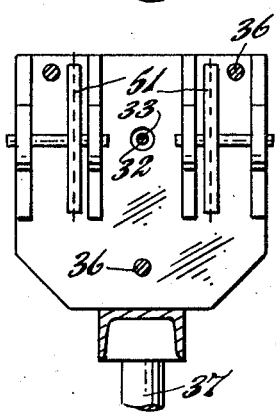
INVENTORS
David C. Aungst
Ira T. Clement
BY
ATTORNEYS United States Patent Office 3,445,552
Patented May 20, 1969

3,445,552
PROCESS FOR MAKING CORRUGATED PLASTIC TUBING
David C. Aungst, Media, and Ira T. Clement, Glen Mills, Pa., assignors to Pennsylvania Fluorocarbon Company, Inc., Clifton Heights, Pa., a corporation of Pennsylvania
Filed Sept. 29, 1966, Ser. No. 582,963
Int. Cl. B29d 23/18
U.S. Cl. 264—40                        1 Claim

ABSTRACT OF THE DISCLOSURE

In making plastic tubing by pushing tubing forward by a mandrel, heat is applied at a place where a new corrugation is to be formed, and step by step as a corrugation forms, the heat is moved in the direction from the corrugated portion of the tubing, thus protecting against overheating.

---

The present invention relates to processes for making corrugated plastic tubing.

The invention is concerned with the production of corrugated plastic tubing by sliding tubing on a mandrel, holding the forward end, positioning an abutment having a face directed rearwardly of the tubing around the forward end of the tubing to determine the contour of the first corrugation, and pushing the tubing forward from the rear to collapse and tubing outwardly and form successive corrugations. The invention is concerned particularly with improved heating of the tubing locally just rearwardly of the previous corrugation which is formed.

In accordance with the invention, heating means provides a stream of heated gases which are directed by a heating chamber around the tubing rearward of the previously formed corrugation. A deflector prevents heating the previously formed corrugation which might result in overheating of the plastic with resultant deterioration. The stream of heated gases is carried out along the tubing in a rearward direction to preheat the tubing. As the next corrugation forms, sensing mechanism which is responsive to the formation of the next corrugation actuates a drive mechanism which moves the heating means, heating chamber and baffle or deflector rearwardly one step so as to heat the tubing for the formation of the next corrugation.

A purpose of the invention is to avoid deterioration of plastic tubing by reason of heating incident to corrugation.

A further purpose is to avoid the necessity of manually advancing a heating means as tubing is corrugated.

A further purpose is to bring a stream of heated gases from a heat source to surround the tubing at the point where the next corrugation is to be formed, to deflect these gases away from the previously formed corrugations so as not to overheat them and to carry the stream of gases out the rearward end of a heating chamber along the tubing so as to preheat it.

A further purpose is to automatically advance the heating means and heating chamber in the direction rearwardly of the tubing in response to sensing and control mechanism responsive to the creation of the previous corrugation.

Further purposes appear in the specification and in the claims.

The present invention relates to a further development of copending U.S. patent application of Ira T. Clement and Walter J. McCaw, Ser. No. 578,836 filed Sept. 12, 1966, for Corrugated Tubing and Process.

In the drawings we have chosen to illustrate one only of the numerous embodiments in which the invention may appear, selecting the form shown from the standpoints of convenience in illustration, satisfactory operation and clear demonstration of the principles involved.

FIGURE 5 is a diagrammatic axial section showing the formation of corrugations with the abutment mounted on a wobble pivot.

Figure 1:
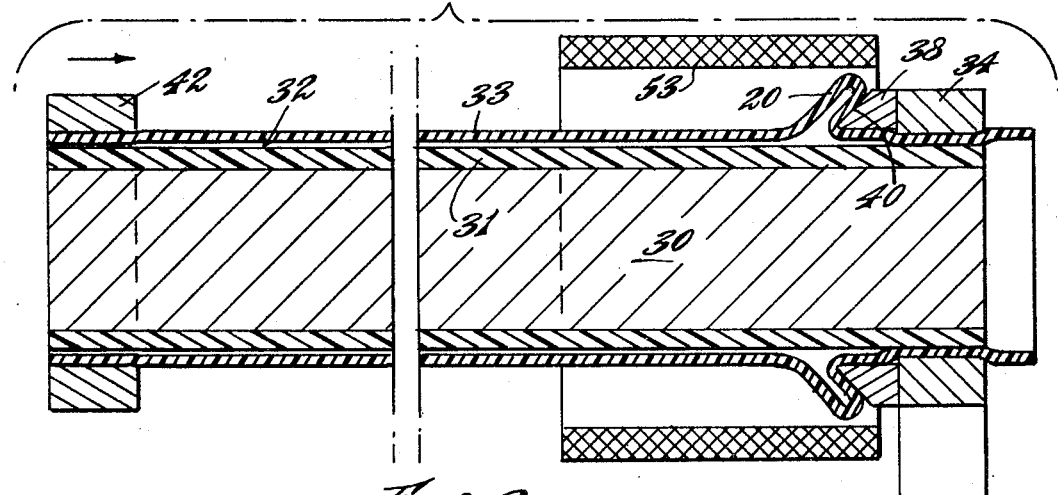
FIGURE 1 is a diagrammatic axial section showing the formation of the first corrugation in a tube, the corrugation having one long side and one short side in cross section.

All of FIGURES 1 to 5 show subject matter of the earlier case above referred to, which is helpful is understanding how the present invention operates.

FIGURE 6 is a diagrammatic perspective of the mechanism of the invention.

FIGURE 6a is an enlarged detailed perspective showing the heating chamber and the heating chamber progression control mechanism.

FIGURE 6b is an axial section of a modified and preferred heating chamber.

FIGURE 7 is a top plan view of the device of FIGURE 6.

FIGURE 8 is a side elevation of the device of FIGURES 6 and 7.

FIGURE 9 is a forward end elevation of the mechanism of FIGURES 6 to 8.

FIGURE 10 is a section on the line 10—10 of FIGURE 7.

FIGURE 11 is a section on the line 11—11 of FIGURE 7.

FIGURE 12 is a section on the line 12—12 of FIGURE 7.

FIGURE 13 is a section on the line 13—13 of FIGURE 7.

FIGURE 14 is a section on the line 14—14 of FIGURE 7.

FIGURE 15 is a diagrammatic view of the pneumatic system.

FIGURE 16 is a diagrammatic view of the pneumatic and electrical control system for progression of the heating chamber.

FIGURE 17 is a diagrammatic section of the control jet mechanism employed in the invention.

Corrugated plastic tubing has been made in the past by molding separate halves and then joining them, by expanding tubing into a female die, or by sliding the tubing on a mandrel, restraining portions of the tubing by a die against outward movement and collapsing intervening portions to form exterior corrugations as best seen in Harding U.S. Patent 2,347,101, granted Apr. 18, 1944, for Method of Making Corrugated Tubing, and in Curtiss et al. U.S. Patent 2,347,086, granted Apr. 18, 1944, for Tube Corrugating Machine.

By the copending application above referred to, improved corrugated plastic tubing is made which can have an oil can or cross-cut saw tooth cross section in annular or helical corrugations, the sides of the corrugations being of unequal length. The copending application also makes corrugations by pushing along the whole length of the tubing without any need for an external die.

In the process of the invention the forward face of an annular abutment at the forward end in the preferred embodiment is convex or concave for making annular corrugations, and for making helical corrugations it is mounted on a wobble pivot so that it can cant with respect to the axis, and also will desirably have a convex or concave forward face.

The present invention is concerned particularly with improved heating of the plastic for forming the next corrugation, avoiding the evils of overheating, and at the same time assuring that the temperature of the tubing at which the corrugation forms will be uniform along the length of the tube.

Plastics

Any one of a wide variety of flexible plastics can be formed in producing tubing by the invention, but it is important that the tubing have adequate elongation and for good results we believe that the ultimate elongation of the plastic at room temperature in the initial form being used for making the corrugated tubing should exceed 100%.

The preferred plastics for making the tubing of the invention are the fluorinated hydrocarbons, such as polytetrafluoroethylene (Teflon TFE), or the copolymer of tetrafluoroethylene and 5 to 35% by weight of hexafluoropropylene (Teflon FEP). Other suitable plastics may be used and tubing according to the invention has been made of polyethylene, flexible polyvinylchloride, and irradiated plastic produced from a mixture of polyethylene and polypropylene. Other suitable plastics may be employed.

The invention has been found not to be operative with polytrifluorochloroethylene (Kel-F), nylon, polypropylene, polyurethane rubber and vulcanized neoprene rubber.

Product

The product of the invention especially when the corrugations are of cross-cut saw tooth formation, and after heat setting, is capable of taking bends on very short radii, without any tendency to kink or obstruct internal flow and the tubing holds the new shape without appreciable tendency to spring back.

Figure 2:
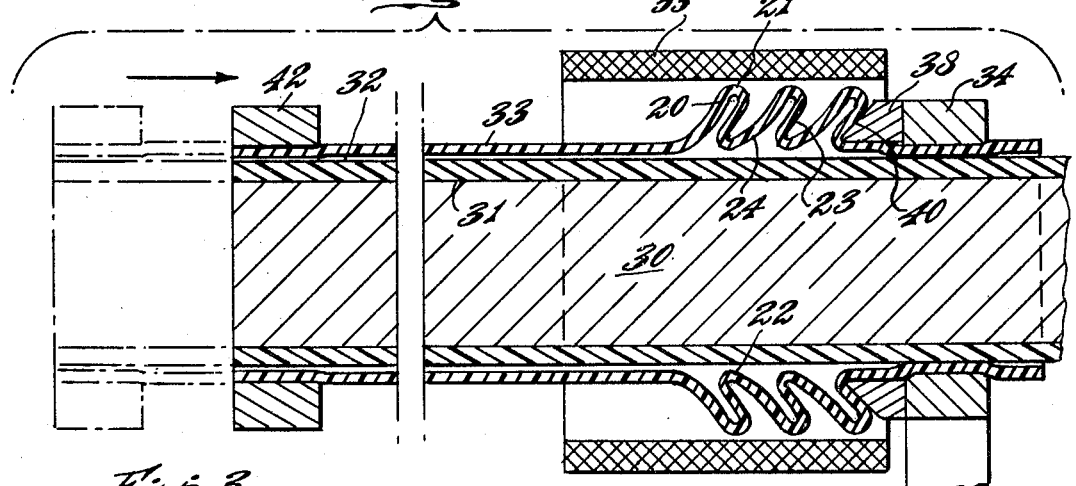
FIGURE 2 is a diagrammatic axial section similar to FIGURE 1 showing the tube after three corrugations have been completed.
Figure 3:
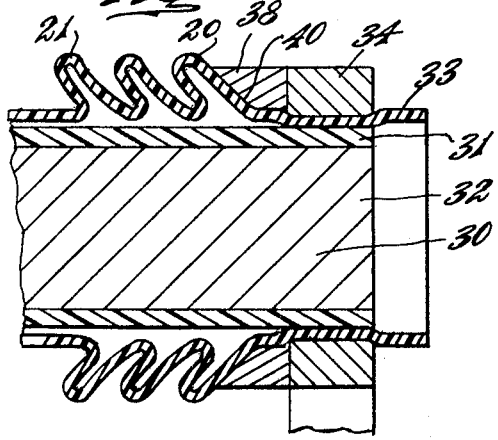
FIGURE 3 is a diagrammatic axial section similar to FIGURE 2, using an abutment which has a concave rather than a convex face.

Thus in FIGURES 1 to 3 this tubing as initially formed and heat set has a series of corrugations 20, which have sharp U bends 21 at the outside and sharp U bends 22 at the inside, the sides of the corrugations being generally parallel and including a short side 23 and a long side 24.

When the tubing is elongated, it will be evident that the short side 23 of the corrugation achieves a condition in which it extends substantially straight out from the axis and the long side 24 of the corrugation is inclined, the inside bend 22 is still sharp, but the outside bend 21 has become more gradual, as shown in the copending application.

If now the tubing is bent on a small radius, for example of the order of its own diameter or smaller, the tendency is for the short sides 23 of the corrugations at the inside to move in under adjoining corrugations, while the short sides 23 of the corrugations at the outside achieve an angle opposing the long sides 24 of the corrugations. This behavior is quite different from that which is commonly encountered with sinusoidal corrugations, which are not able to move freely in under adjoining corrugations since both corrugations are symmetrical. This tubing can take sharp bends without kinking and hold the bends without appreciable springback, especially when it is made from the fluorinated hydrocarbons with heat setting.

The detail of the construction of the tubing is not part of the present invention but is covered by the copending application.

Figure 4:
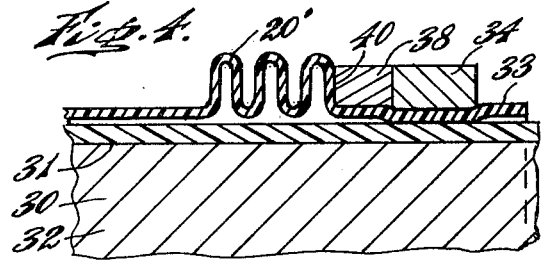
FIGURE 4 is a view similar to FIGURE 2 showing the formation of corrugations having generally equal sides in cross section, using an abutment which has a face transverse to the axis.

Tubing may be made according to the invention with generally equal-sided corrugations 20′ by having an abutment which extends straight out at right angles to the axis as shown in FIGURE 4. This, however, is not usually preferred.

One great advantage of the corrugated plastic tubing of the invention is that its walls are not appreciably thinned at any point in forming the corrugations, and, therefore, no location of weakness exists. Corrugated plastic tubing made in accordance with the invention having the cross-cut saw tooth configuration of individual annular corrugations has been bent several thousand cycles without failure. The diameter of the tubing according to the invention is not reduced internally beyond the initial diameter of the tube, so that there is no tendency to retard flow even in an integral tube in which a portion is straight and another portion is corrugated.

Corrugated tubing in accordance with the invention can be produced in a wide range of internal diameters as large as 10 inches and as small as 1/16 inch. Extensive demand appears to exist for corrugated tubing of the invention in size ranges between 1/8 inch and 1 inch in 1/8 inch increments.

The permissible approximate relation of the wall thickness to the internal diameter in corrugated tubing according to the invention is as follows:

| Tubing inside diameter in inches | Approximate range of wall thickness in inches | Approximate range of wall thickness in percent of inside diameter | Preferred wall thickness in inches |
|---|---|---|---|
| 0.060 | 0.006–0.012 | 10–20 | 0.008 |
| 0.250 | 0.010–0.030 | 4–12 | 0.015 |
| 0.375 | 0.015–0.030 | 4–8 | 0.020 |
| 0.500 | 0.018–0.035 | 3.5–7 | 0.020 |
| 0.625 | 0.018–0.035 | 2.9–5.6 | 0.020 |
| 0.750 | 0.020–0.040 | 2.3–4.6 | 0.025 |
| 0.875 | 0.020–0.040 | 2.1–4.2 | 0.030 |
| 1.000 | 0.020–0.040 | 2–4 | 0.030 |
| 2.000 and larger | 0.020–0.050 | 1–2.5 | 0.035 |

When the corrugated tubing of the invention is formed, the corrugations are close packed, but these corrugations can be pulled out or separated by applying longitudinal pull on the tube as desired. Usually the close-packed corrugations are made from a straight plastic tube of 2½ to 3 times its final length. The ability to stretch the corrugations longitudinally is helpful in some cases in applying tubing to fittings in narrow spaces.

For best results in holding bends without springback, the relation of the inside diameter to the wall thickness should be as follows:

| Tubing inside diameter in inches: | Minimum wall thickness in inches for holding position in best manner without springback |
|---|---|
| ¼ | 0.015 |
| ⅜ | 0.020 |
| ½ | 0.020 |
| ⅝ | 0.025 |
| ¾ | 0.030 |
| ⅞ | 0.030 |
| 1 | 0.035 |

Tests show that the thicker the wall, the smaller the number of corrugations which can be formed in a given length. For Teflon-FEP the following data were obtained:

| Inside diameter in inches | Wall thickness in inches | Corrugations per foot |
|---|---|---|
| ¼ | 0.015 | 79 |
| ⅜ | 0.020 | 76 |
| ½ | 0.020 | 54 |
| ⅝ | 0.020 | 40 |
| ¾ | 0.030 | 35 |
| ⅞ | 0.040 | 30 |
| 1 | 0.030 | 25 |

In making tubing in accordance with the invention, a suitable straight plastic tubing will be used as a starting material. While the tubing need not be circular in cross section, it will ordinarily be such, and for simplicity the discussion will be directed to tubing of circular section.

The relation of wall thickness to diameter of tubing will be as above set forth.

A smooth mandrel is placed inside the tubing suitably by slipping the tubing on the mandrel. While the outside diameter of the mandrel can be the same as the inside of the diameter of the tubing, in which case the clearance is 0.000 inch, it is preferable to provide a clearance between the inside diameter of the tubing and the outside diameter of the mandrel of at least 0.005 inch, but the diametral clearance must not exceed 0.030 inch, since if the clearance is greater than this, the corrugations form in a haphazard and nonrepetitive manner which is objectionable. If no clearance is used, there may be a tendency to bind, especially if the longitudinal force is applied to the tube over a long distance. The clearance between the inside diameter of the tube and the outside diameter of the mandrel should preferably be about 0.010 inch.

It is decidedly desirable to use a slippery surface on the mandrel. This is best obtained by employing a mandrel having a metallic core 30 and a coating or sleeve 31 of polytetrafluoroethylene or Teflon FEP. It is also good practice to use a lubricant between the mandrel and the tube. While lubricanats of the character of finely divided talc may be used, it is preferable to use a liquid lubricant such as an oil, preferably water soluble polyalkylene glycol (Union Carbide Ucon).

Once the mandrel 32 is slid through the plastic tube 33, the tube should be anchored at its forward end in the direction of pushing. This is preferably done by gripping the tube against the mandrel by collet 34 which holds the tube and mandrel firmly together until the collet is released, the collet being held by a crosshead 35 fixed on longitudinal guides 36 held by a frame 37.

An annular abutment 38 is provided extending generally outside the tube as a means of defining the first corrugation. The abutment 38 preferably rests against collet 34 on the side from which the tube is being pushed. The abutment has a face 40 directed to the rear of the tube, which for many aspects of the invention should be inclined to the axis suitably at an angle between about 30° and 60° so as to form a convex abutment as in FIGURES 1 and 2, or a concave abutment as in FIGURE 3. Either of these formations create the cross-cut saw tooth shape of corrugations as preferably described which are so desirable in the present invention, and assure the formation of corrugations which are annular rings rather than endless helices if the abutment is symmetrical to the axis. Less desirably and where corrugations which are symmetrical or approaching sinusoidal are desired, the abutment face 40 can be transverse to the axis as in FIGURE 4.

If the abutment is free to cant its angle to the axis corresponding to a pitch angle, it will produce a first corrugation and successive corrugation will form thereon in the form of a helix. In FIGURE 5 the abutment 40' is shown mounted on a wobble pivot or ball 41 in a wobble pivot bearing 41', the center of the ball being on the axis. The ball is desirably hollowed to permit the tube and mandrel to extend therethrough to be engaged by the forward collet. The abutment 40' may as shown be concave or convex so as to form corrugations of cross-cut saw tooth shape as shown or it can be at a right angle to the axis when symmetrical so as to produce uniform corrugations.

When an abutment is mounted on a wobble pivot as shown, as the first corrugation begins to form, the abutment by itself wobbles about the wobble pivot and creates the beginning of a helix which continues as successive corrugations are formed without further change in the apparatus or process.

Any convenient mechanism may be used to push or pull on the rear of the tube in an axial direction. It is not necessary and there is no advantage in the present invention in employing intermittent push or pull, the pushing or pulling being preferably continuous. For this purpose it has been found convenient to grip the tube lightly near the rear by a collet 42 which does not grip against the mandrel. The collet 42 is urged forward in the axial direction by chains 50 from suitable pulling mechanism 43. A convenient pulling mechanism has been found to be a motor 44 turning a speed reducer 45 for driving clutch 46 by chain drive 46', which clutch slips beyond a predetermined torque level. The clutch 46 drives reverse gearing 47 by shaft 47' which gearing oppositely drives sprockets 48, carrying chains 50, meshing at the opposite end of the machine in suitably journalled idler sprockets 51. Chains 50 at respective upper and lower stretches are anchored to crosshead 52 which slides on guides 36. Crosshead 52 carries collet 42.

Thus the pushing or pulling mechanism always maintains a predetermined axial force on the rear collet 42. Merely as a gauge of this, it has been found that in corrugated ¾ I.D. tubing having a wall thickness 0.030 inch made of the copolymer of tetrafluoroethylene and 5 to 35% by weight of hexafluoropropylene (Teflon FEP), the axial force should be about 70 pounds. In tubing made for tetrafluoroethylene having a ¾ inch diameter and a wall of 0.040 inch, the axial force will suitably be around 120 pounds.

The tubing should be heated in accordance with the present invention at the point where the next corrugation is going to form to about the heat distortion temperature. Suitable heat distortion temperatures for various materials are as follows:

|  | ° F. |
| --- | --- |
| Teflon FEP | about 250 |
| Teflon TFE | about 250 |
| Polyethylene | about 120 |

The heat distortion temperature is determined according to ASTM specification D648–51 (66 p.s.i.).

Because of the fact that prolonged heating of the plastics is not desirable, it is preferable to heat the forward end of the tubing locally rather than to heat the entire length of the tube. An air heater of the character of a hair drier, heat gun, radiant heater or electric resistance heater may be used as desired, and if necessary to obtain uniform heating, the tubing can be rotated.

As shown in FIGURES 6 to 14, a heating chamber 53 surrounds the forward end of the tube in spaced relation, receiving hot air blown in at 54 from a hot air heater 55, preferably as shown in FIGURE 6a, deflecting it away from the last corrugation by a baffle 56 at the forward end, and allowing the heat to travel around the tube rearwardly in a cylindrical portion and be discharged through a conical rearward portion 57 of the heating chamber, the heated air as it discharges preheating tubing which is shortly to form corrugations. The heating chamber and hot air heater are mounted on sliding bearings 58 sliding on the guides 36 previously mentioned. A rack 61 is secured on the forward crosshead 35 and extends over and rests on a sliding support 62 on the rear crosshead. Also on the sliding bearings 58 and secured to the heating chamber is a drive motor 63, which has a built-in speed reducer and carries a drive gear 64 meshing with the longitudinal rack.

While from the standpoints of some aspects of the invention, the motor, which is desirably reversible, can be manually controlled by an operator to move the heating means rearward as the corrugations form, it is decidedly preferable according to the present invention to move the heating means and associated parts including the heating chamber automatically step by step rearward as the corrugations form. Any control means responsive to the formation of a corrugation can be used, but we prefer to employ a pneumatic jet device in which one jet projected across an air gap is normally interrupted by another jet, but the intercepting jet is interrupted or interfered with when a corrugation forms in order to energize a heater drive motor.

In the device shown especially in FIGURES 15, 16 and 17, which may be a system as shown in Moore Products Company Catalogue AD 97–1, a source of air under pressure regulated by a pressure regulator 70 passes through a power nozzle 71 to form a gap jet 72. The gap jet 72 when not interrupted enters an opposed pressure recovery nozzle 73, and actuates a pneumatic relay 74 to close a pressure switch 75 completing electrical contact 76 to energize the heater drive motor which is in circuit with a power source 77. The device just described is located at one side of the heater chamber and preferably outside thereof.

Located suitably outside the heating chamber 53 on the opposite side thereof is a power air nozzle 80 receiving compressed air from regulator 70 and projecting a sensing air stream 81 through ports 83 and 84 on opposite sides of the heater chamber 53 so as to normally interrupt the air gap jet 72 so as to maintain the pressure switch in its normally open position.

When a corrugation 20 forms, this interrupts the sensing air stream 81 and causes it to cease its dissipation of the air gap jet 72, so that the air gap jet 72 will energize the pressure switch 75, causing the pneumatic relay 74 to pick up and cause the pressure switch 75 to close, energizing the drive motor. The drive motor, therefore, continues to drive the heater back until the corrugation 20 ceases to interrupt the sensing air stream and normal conditions are restored, at which time the pressure switch opens and the motor ceases to be energized during that step.

In FIGURE 15 we show a typical layout for pneumatic and electrical components. In this mechanism a main compressed air supply 90 enters through a filter 91, a main regulator 92 and a lubricator 93. The rear collet 42 is energized from an air line 94 and a three-way valve 95 through a regulator 96 having in the line a gauge 97.

The rear collet is engaged so that it grips the tube but does not squeeze it tightly against the mandrel. In one position of the three-way valve 95 the collet 42 is released by connecting exhaust line 94' to atmosphere. The forward collet 34 is similarly energized from the same air line by a three-way valve 98, which connects to a pressure line 99 and an exhaust line 99', but as it does not require precise adjustment, the extra regulator and gauge can be eliminated.

An air line 100 passes through a regulator 101 in communication with a pressure gauge 102 to the pneumatic control for torque-adjustable clutch 46. Another air line 103 feeds a regulator filter and gauge combination 70, which supplies air to line 105 for sensing nozzle 80 and for air gap nozzle 71 on opposite sides of heating chamber 53.

The pressure recovery nozzle 73 supplies air to pressure recovery line 108 to pneumatic relay 74 having a main pressure connection at 111 and connecting by line 112 to pressure switch and gauge combination 113, which has an electrical contact 76 for the control of the heater drive motor 63.

After formation of the corrugations along the tubing in close-packed relation, it is decidedly desirable to heat set the corrugations in the tube if the plastic is heat settable. This involves heating preferably by removing the mandrel and the tube to a heating means or a heating medium which can be a hot oil bath, a salt bath, a liquid heating means or an air oven.

Suitable heat setting temperatures for various materials, assuming a time of at least 10 minutes, are as follows:

| | °F. |
|---|---|
| Teflon FEP | 300–400 |
| Teflon TFE | 450–500 |
| Polyethylene | 170–190 |
| Flexible polyvinylchloride | 190–220 |
| Irradiated mixture of polyethylene and polypropylene | 225–250 |

The corrugations can be formed by hand by applying the pushing force manually.

The sizes of the corrugations are controlled by such facts as the inside diameter of the tubing, the wall thickness, the nature of the plastic, the temperature and the longitudinal pull.

In operation, assuming that the tubing has been slid on a proper mandrel of proper size for the tubing as previously explained, and that the collets have been properly engaged and the forward abutment properly positioned, the heating means has been actuated and the control and drive, therefore, has been energized. The shape of the first corrugation will be influenced by the contour and symmetrical or non-symmetrical orientation of the face of the abutment looking toward the rear of the tubing. If the abutting surface is either convex or concave and concentric or symmetrical, the first corrugation will be annular and of cross-cut saw tooth formation as already explained and the succeeding corrugations will follow the shape of the first. If, on the other hand, the abutment is askew with respect to the axis or non-symmetrical in order to conform to the angle, the corrugations will be helical and if the abutment is convex or concave, they will also be of oil can formation.

If the rearward abutting face extends out transversely to the axis then the corrugations will be symmetrical or approaching sinusoidal.

Unlike some of the prior art processes, no die rearward of the forward abutment is required in forming the corrugations.

The heating means and chamber move stepwise rearwardly if successive corrugations are formed, and the formation of one corrugation triggers the rearward motion of the heating means and heating chamber to aid in formation of the next corrugation, while at the same time assuring that the corrugations which have been formed are protected against overheating.

After completion of the corrugations along the length of the tube or as far as they are to extend, the tubing and the mandrel are removed by releasing the collets and placed in a heat setting oven or the like.

Uses of corrugated tubing

Corrugated tubing of the invention is particularly useful because of its ability to take a very short bend without kinking and retain that bend without springback. The tubing can be used to control flow in chemical apparatus, for heat transfer mechanism such as heating, air conditioning and cooling systems and for vacuum tubing where it is very resistant against collapsing and for electrical applications including cable insulation and conductor insulation.

The great surface of the tubing aids in heat transfer and the corrugations promote turbulent flow which is a great assistance in heat transfer.

Other uses of the tubing of the invention are described more in detail in the copending application above referred to.

modifications to meet individual whim or particular need will doubtless become evident to others skilled in the art to obtain all or part of the benefits of our invention, without copying the apparatus and process shown.

Having thus described our invention what we claim as new and desired to secure by Letters Patent is:

1. In a process for making corrugated plastic tubing, comprising providing a mandrel having an outside diameter which is not more than 0.030 inch less than the inside diameter of the tubing, slipping tubing of plastic of class consisting of polytetrafluoroethylene, copolymers of tetrafluoroethylene and 5 to 35% by weight of hexafluoropropylene, polyethylene, flexible polyvinylchloride and irradiated mixtures of polyethylene and polypropylene which as formed has an ultimate elongation of at least 100% at room temperature on to the mandrel, the tubing having a relation of inside diameter to wall thickness as follows:

| Tubing inside diameter, in.: | Approx. permissible range of wall thickness in percent of inside diameter |
|---|---|
| 0.060 | 10–20 |
| 0.250 | 4–12 |

| Tubing inside diameter, in.: | Approx. permissible range of wall thickness in percent of inside diameter |
|---|---|
| 0.375 | 4–8 |
| 0.500 | 3.5–7 |
| 0.625 | 2.9–5.6 |
| 0.750 | 2.3–4.6 |
| 0.875 | 2.1–4.2 |
| 1.000 | 2–4 |
| 2.000 and larger | 1–2.5 | anchoring the forward end of the tubing, providing around the tubing adjacent the forward end an abutment having a face toward the rearward end of the tubing which predisposes the shape of the first corrugation, the outside of the tubing being unconfined, pushing the tubing longitudinally from a point near the rearward end toward the abutment to collapse the tubing against the abutment and against forward corrugations to make successive corrugations, the improvement which comprises heating the tubing around the outside at the point where the next corrugation is about to form, directing heat along the tubing rearward of the point of heating to preheat the tubing, deflecting the heat forward from the previous corrugation to avoid overheating the previous corrugation, sensing the location on the tubing at which heating is occurring to obtain a response when a new corrugation forms, and advancing the point of heating automatically rearwardly of the tubing step by step as soon as a new corrugation forms.

References Cited
UNITED STATES PATENTS

| 2,897,545 | 8/1959 | Meissner | 18—19 |
| 3,150,576 | 9/1964 | Gewiss | 264—286 |
| 3,335,484 | 8/1967 | Parker | 264—322 XR |
| 3,343,220 | 9/1967 | Martinek | 18—19 |
| 3,370,118 | 2/1968 | Lowe | 264—325 |

ROBERT F. WHITE, *Primary Examiner.*

RICHARD R. KUCIA, *Assistant Examiner.*

U.S. Cl. X.R.

264—322

UNITED STATES PATENT OFFICE
CERTIFICATE OF CORRECTION

Patent No. 3,445,552                                              May 20, 1969

David C. Aungst et al.

It is certified that error appears in the above identified patent and that said Letters Patent are hereby corrected as shown below:

Column 1, line 29, "and", first occurrence, should read -- the --. Column 2, line 22, "is", second occurrence, should read -- in --. Column 8, after line 52, insert as a new paragraph -- In view of our invention and disclosure, variations and --.

Signed and sealed this 24th day of March 1970.

(SEAL)
Attest:

Edward M. Fletcher, Jr.                              WILLIAM E. SCHUYLER, JR.
Attesting Officer                                            Commissioner of Patents